United States Patent
Demanet

(10) Patent No.: US 11,785,875 B2
(45) Date of Patent: Oct. 17, 2023

(54) GEARBOX DEVICE FOR AGRICULTURAL MACHINES AND RELATED METHOD

(71) Applicant: KUHN SAS, Saverne (FR)

(72) Inventor: Didier Demanet, Saint-Louis (FR)

(73) Assignee: KUHN SAS, Saverne (FR)

( * ) Notice: Subject to any disclaimer, the term of this patent is extended or adjusted under 35 U.S.C. 154(b) by 0 days.

(21) Appl. No.: 17/663,508

(22) Filed: May 16, 2022

(65) Prior Publication Data

US 2022/0369533 A1    Nov. 24, 2022

(30) Foreign Application Priority Data

May 18, 2021    (FR) ...................................... 2105177

(51) Int. Cl.
*A01B 71/00*    (2006.01)
*A01B 71/06*    (2006.01)
*F16H 3/089*    (2006.01)

(52) U.S. Cl.
CPC ........... *A01B 71/066* (2013.01); *F16H 3/089* (2013.01); *F16H 2200/0034* (2013.01)

(58) Field of Classification Search
CPC .................. A01B 71/066; F16H 3/089; F16H 2200/0034; F16H 2061/047; F16H 3/24; F16H 3/002; F16H 2306/48; F15H 61/0403
See application file for complete search history.

(56) References Cited

U.S. PATENT DOCUMENTS

2008/0098837 A1*   5/2008   Hiroi ................... F16H 61/0437
                                                                74/331

FOREIGN PATENT DOCUMENTS

| FR | 1 472 155 A | 3/1967 |
|----|-------------|--------|
| GB | 736521 A | 9/1955 |
| JP | 57-176949 U | 11/1982 |

OTHER PUBLICATIONS

French Preliminary Search Report dated Dec. 21, 2021 in French Application 21 05177 filed on May 18, 2021, 8 pages (with English Translation of Categories of Cited Documents & Written Opinion).

* cited by examiner

*Primary Examiner* — Victor L MacArthur
(74) *Attorney, Agent, or Firm* — Oblon, McClelland, Maier & Neustadt, L.L.P.

(57) ABSTRACT

A gearbox device for an agricultural machine includes: a primary shaft, a secondary shaft, at least one intermediate shaft, and a motion transmission element moveable between at least two operating positions in which it sets up intermeshing drive lines between the primary shaft and the secondary shaft with different gear ratios, at least one of the drive lines incorporating the intermediate shaft, the motion transmission element passing through at least one neutral position during its movement between the at least two aforementioned operating positions. The gearbox device further includes a manually-operated pivoting device that makes it possible to make at least one of the primary, secondary, and intermediate shafts pivot around its rotation axis when the motion transmission element is in the neutral position.

13 Claims, 9 Drawing Sheets

[Fig. 1]
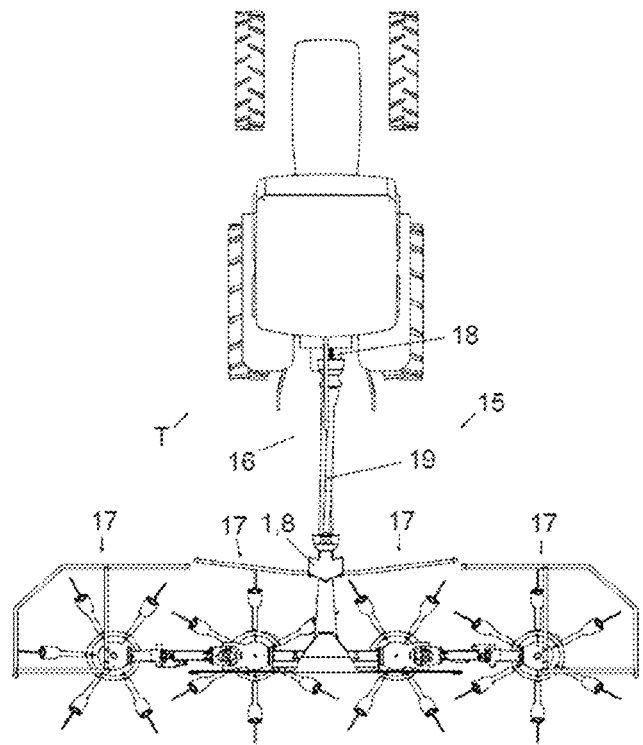
[Fig. 2A]
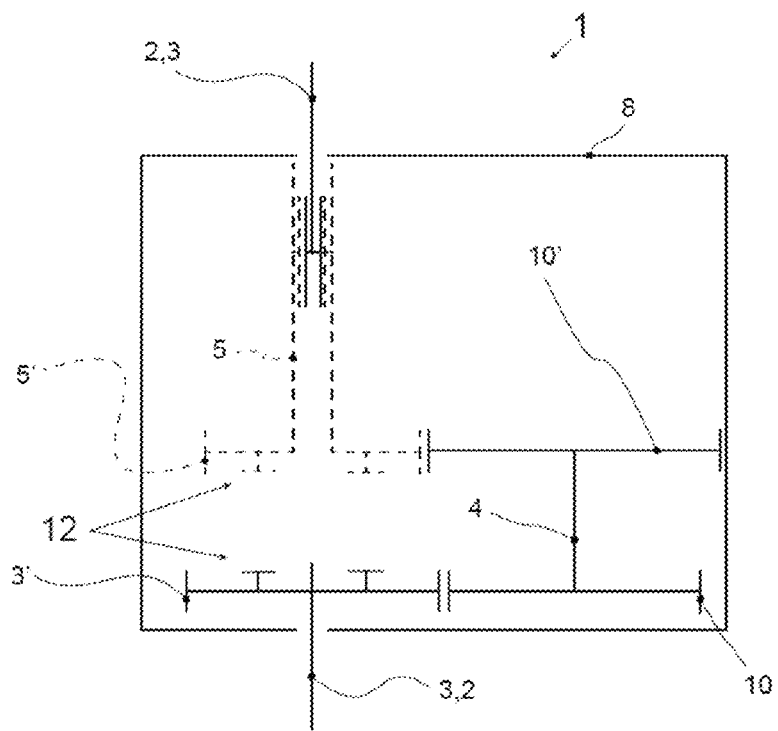

[Fig. 2B]
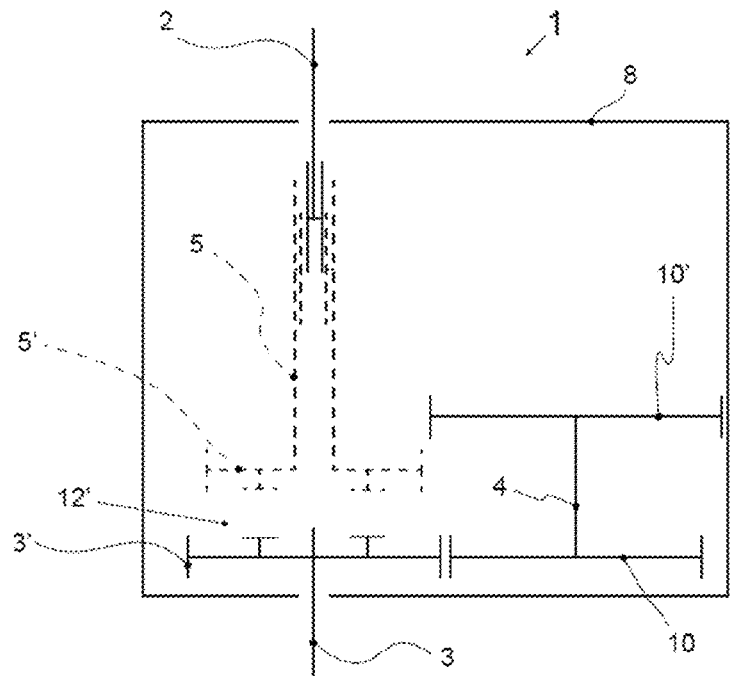
[Fig. 2C]
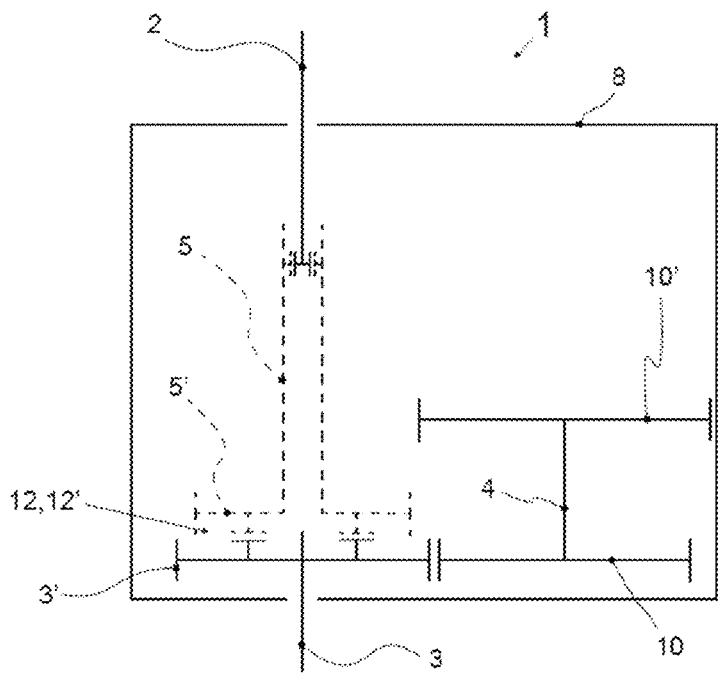

[Fig. 3A]
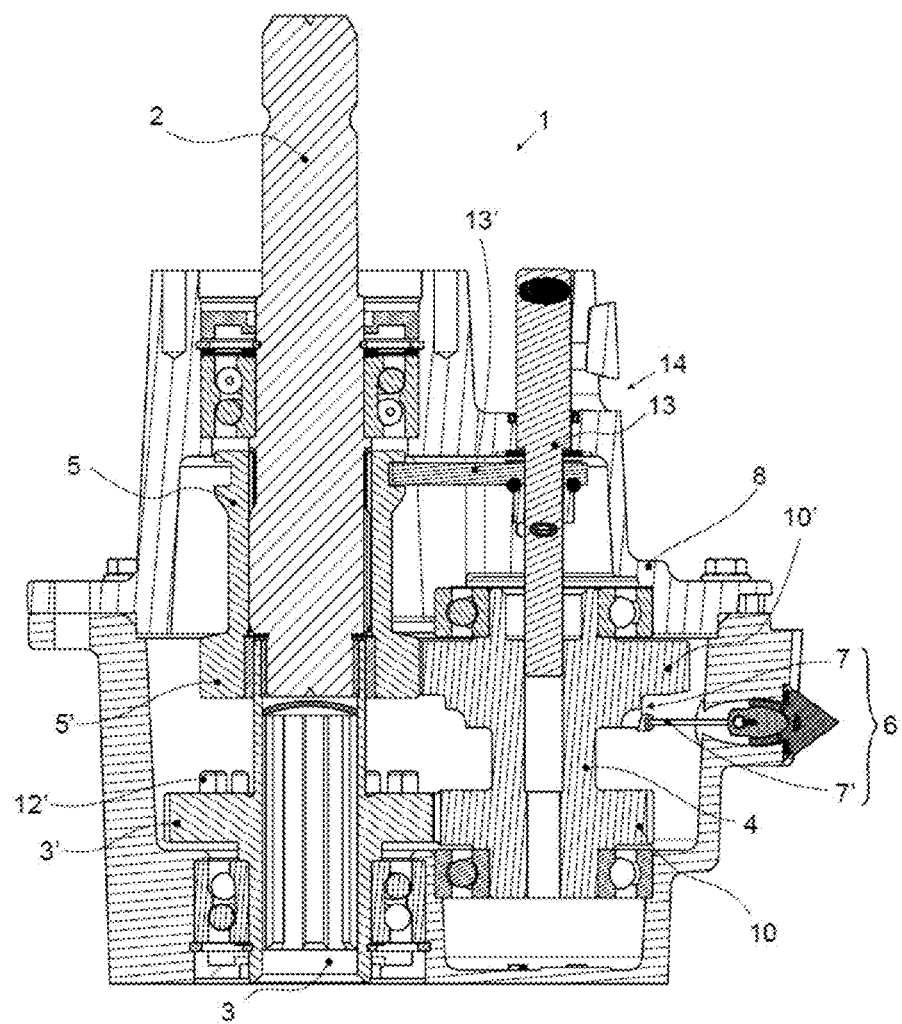

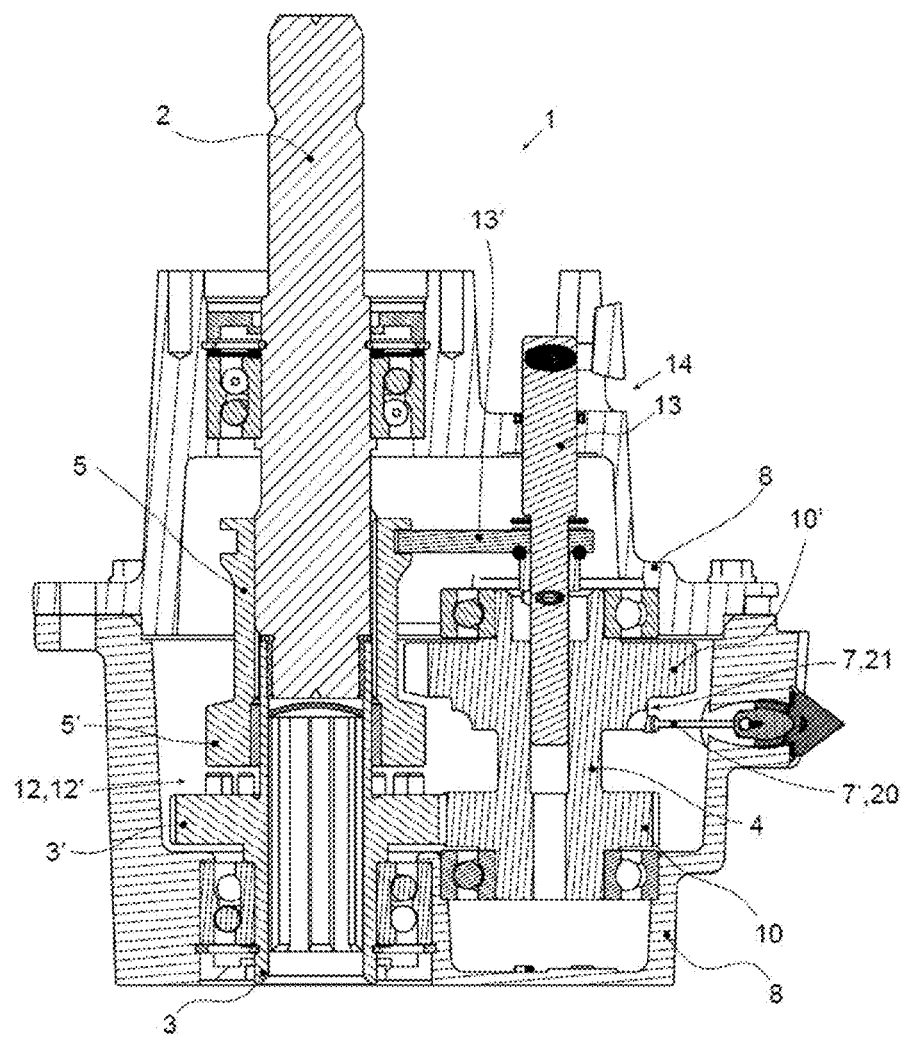
[Fig. 3B]

[Fig. 3C]
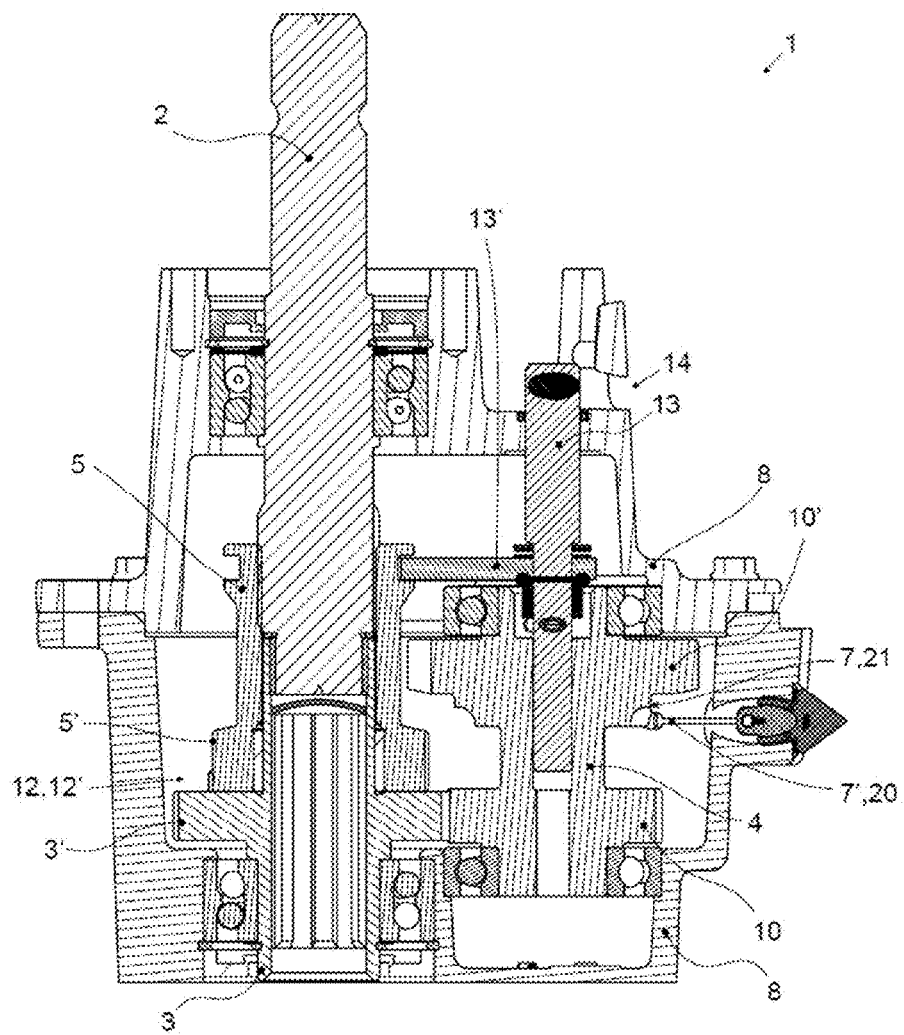

[Fig. 4]
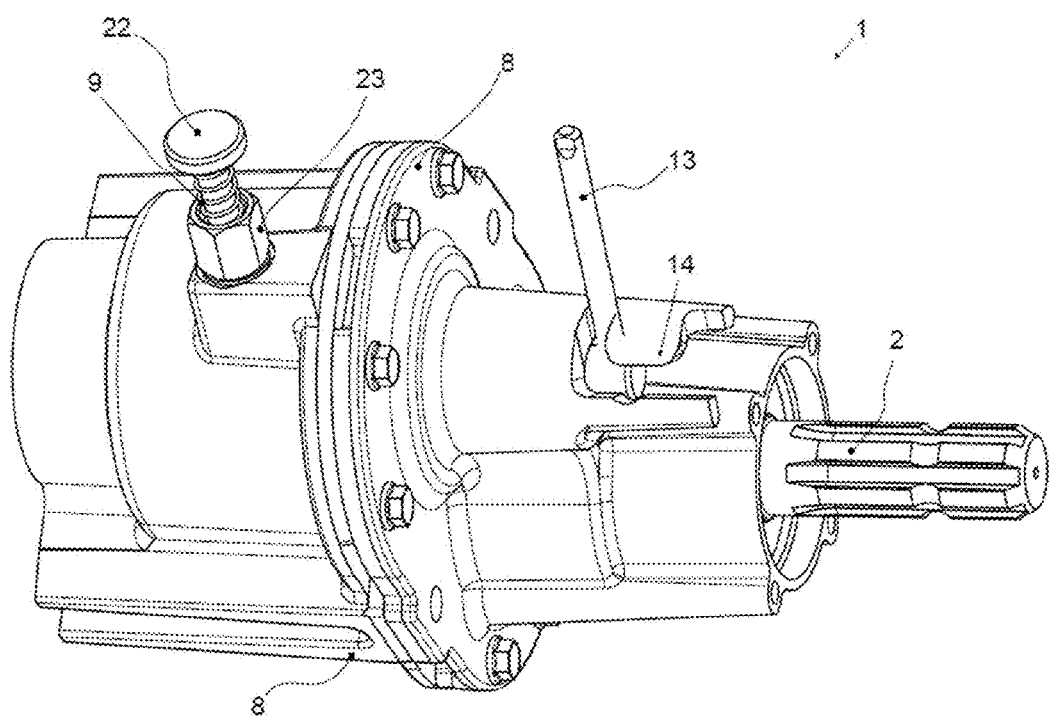

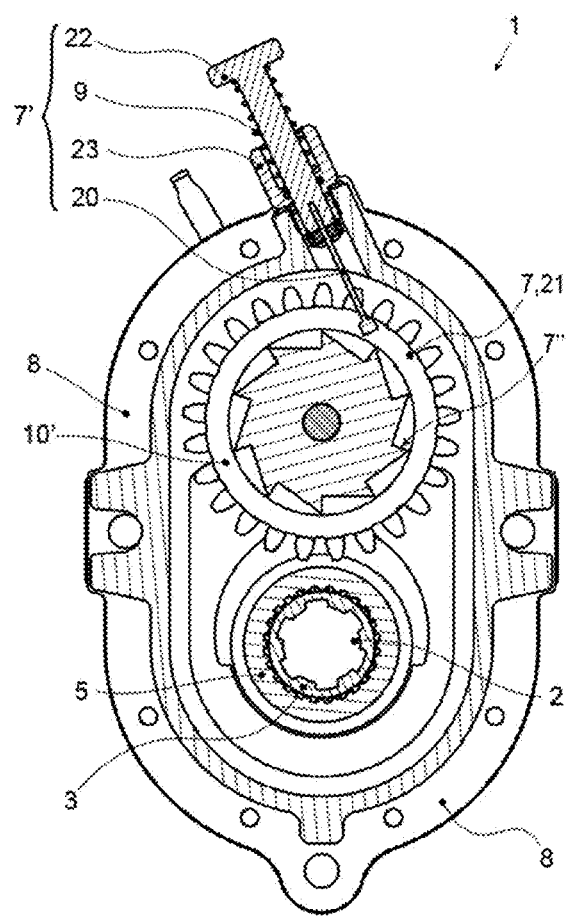
[Fig. 5A]

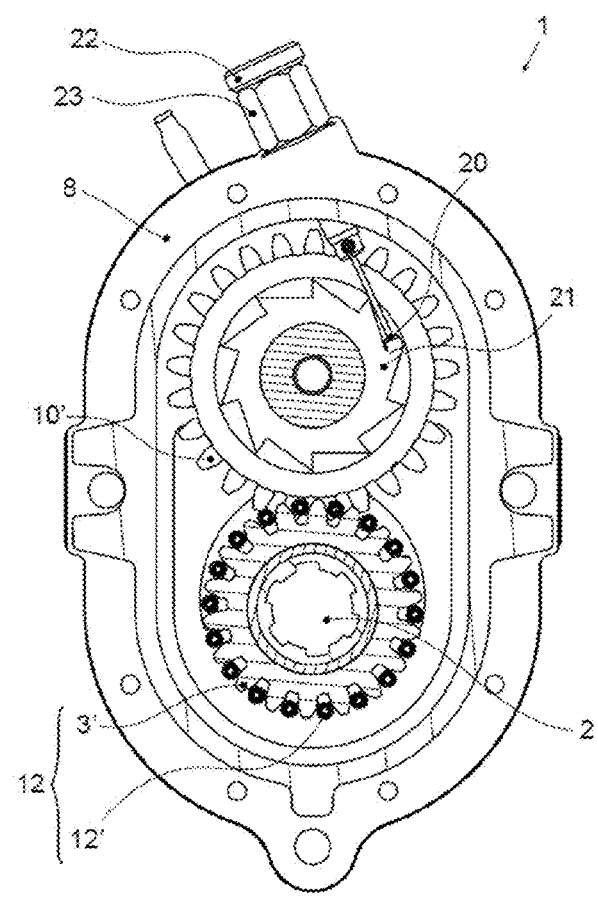
[Fig. 5B]

[Fig. 6]
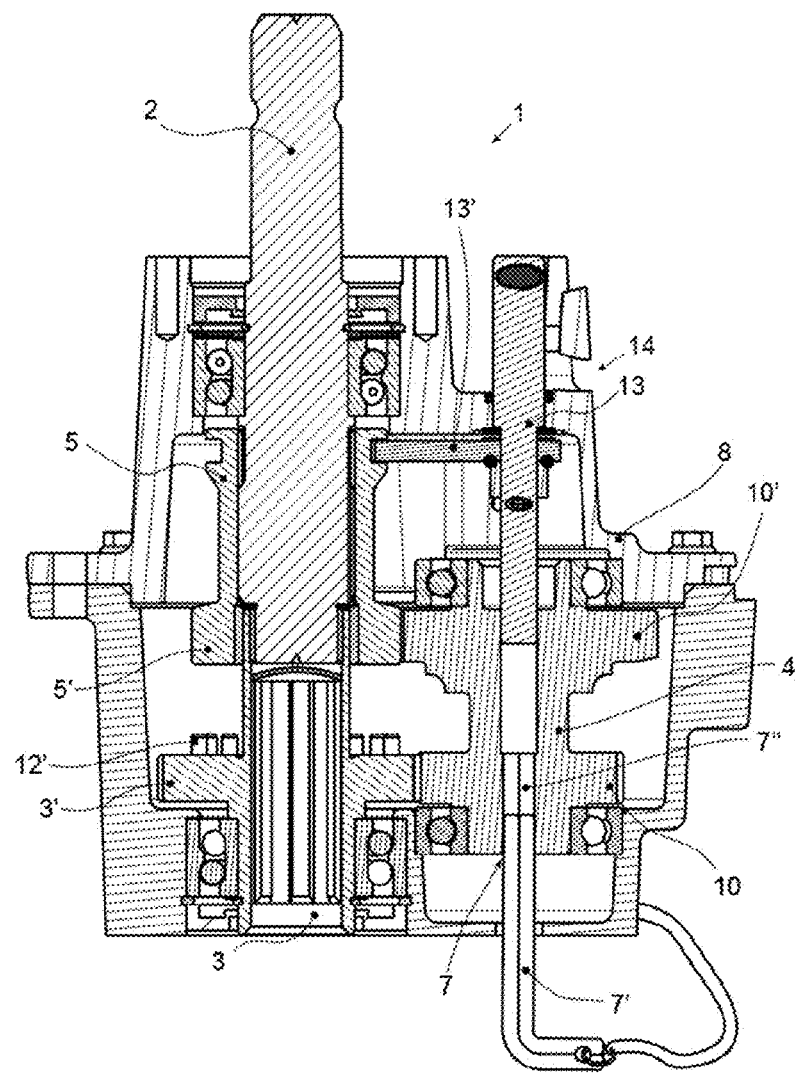

GEARBOX DEVICE FOR AGRICULTURAL MACHINES AND RELATED METHOD

BACKGROUND OF THE INVENTION

Field of the Invention

The present invention relates to the field of agricultural machinery and of equipment for such machines, more specifically the motion transmission systems of such machines, and its subject is a gearbox device for an agricultural machine and a machine fitted with such a device.

Description of the Related Art

In the state of the art, the gearboxes present in the drive line between the tractor's power take-off shaft and the agricultural machine connected to the latter generally comprise two inputs, i.e. two input shafts. Consequently, at each change of transmission ratio, the telescopic drive shaft must be disconnected from one input and connected to the other, and vice versa.

For gearboxes incorporated in the machine (see FIG. 1) and comprising an internal mechanism for changing the transmission ratio, it is usually required for one work element to be brought manually to rotate to adjust the gear teeth ensuring the coupling of the input and output shafts.

However, in order to access a work element at the same time as moving a pinion to change the transmission ratio, the gearbox must be near the work elements. Further, where the work elements are pointed or sharp, the user can easily be injured when grasping the work element.

Document FR 2 778 443 discloses a gearbox device, which comprises a primary shaft, a secondary shaft, at least one intermediate shaft, and a motion transmission element movable between at least two operating positions in which it sets up intermeshing drive lines between the primary and secondary shafts with different gear ratios, at least one of the drive lines incorporating the intermediate shaft, the motion transmission element passing through at least one neutral position during its movement between the at least two aforementioned operating positions.

A major drawback of this gearbox, which is moreover rather intended for driving the wheel(s) of a self-propelled vehicle, is that it requires and must comprise a coupling through adhesion to perform the gear ratio change, with possible slippage: this requirement complicates the machine's construction, increases its cost, and requires regular maintenance.

SUMMARY OF THE INVENTION

The present invention aims specifically to overcome these drawbacks.

To this end, its subject is a gearbox device of the above-mentioned type, for an agricultural machine, and wherein the gearbox device comprises a pivoting means that makes it possible by a manual operation to make at least one of the primary, secondary and intermediate shafts pivot around its respective rotation axis when the motion transmission element is in the neutral position. The subject of the invention is also a method to change the ratio of such a gearbox device.

BRIEF DESCRIPTION OF THE DRAWINGS

The invention will be better understood from the following description, which refers to a preferred embodiment given as a non-limiting example and explained with reference to the attached schematic drawings, in which:

FIG. 1 shows a tedder connected to a tractor and incorporating a gearbox near the working tools or elements;

FIG. 2A,
FIG. 2B and
FIG. 2C are schematic sectional views, in elevation along a plane comprising the rotation axis of the shafts, of a gearbox device according to one embodiment of the invention, respectively in three different configurations matching different positions of the mobile motion transmission element, namely, in a first transmission gear ratio (FIG. 2A: the drive line incorporating the intermediate shaft), in neutral position (FIG. 2B: no movement transmission between the primary and secondary shafts), and in a second transmission gear ratio (FIG. 2C: direct drive between motion transmission element and secondary shaft);

FIG. 3A,
FIG. 3B and
FIG. 3C are sectional views similar to those in FIG. 2 (the configurations of FIGS. 3A to 3C are respectively identical to those of FIGS. 2A to 2C) of a preferred embodiment of a device such as shown schematically in FIG. 2;

FIG. 4 is a perspective view of the gearbox device of FIG. 3;

FIG. 5A and
FIG. 5B are sectional views along planes perpendicular to the rotation axis of the shafts of the gearbox device of FIGS. 3 and 4; and FIG. 6 is a sectional view similar to those of FIG. 2 of an alternative embodiment of a device according to the invention.

DETAILED DESCRIPTION OF THE PREFERRED EMBODIMENTS

FIGS. 2 to 5 show a gearbox device (1) for an agricultural machine, comprising a primary shaft (2), a secondary shaft (3), at least one intermediate shaft (4), and a motion transmission element (5) movable between at least two operating positions in which it sets up intermeshing drive lines between the primary shaft (2) and the secondary shaft (3) with different transmission gear ratios. At least one of the drive lines incorporates the intermediate shaft (4), the motion transmission element (5) passing through at least one neutral position during its movement between the at least two aforementioned operating positions.

In accordance with the invention, the device (1) furthermore comprises a pivoting means (6) that makes it possible, by a manual operation, to make at least one of the primary (2), secondary (3), and intermediate (4) shafts pivot around its respective rotation axis when the motion transmission element (5) is in the neutral position.

In this way, thanks to the invention, a pivoting means (6) is provided that makes it possible to adjust the position of at least one of the shafts (2, 3, 4) around its rotation axis, making it possible, by a manual operation controlled by the user, to make the teeth of the concerned gears match when the machine is stopped, so as to be able to achieve the coupling with the mobile motion transmission element (5), without having to manually run the working tools or elements, thereby avoiding the risks of injury. In addition, incorporating the pivoting means (6) in the device (1) gives greater freedom concerning the location of the device (1) in the drive line. More specifically, in the case of a trailed machined, for example a trailed tedder or mower, bringing the gearbox device (1) closer to the tractor (T) gives quicker access to it, thus speeding up the change of transmission ratio, without taking risks near the working tools.

As shown in FIGS. 2 and 3, and in accordance with a simple and compact embodiment of the invention, the motion transmission element (5) is mounted locked in rotation with on either the primary shaft (2) or the secondary shaft (3). In addition, the motion transmission element (5) is mounted with the ability to move in translation along the rotation axis of the shaft (2, 3) on which it is mounted.

The movement of the motion transmission element (5) can be effected, for example, by means of an operating handle (13). The handle (13) can be operated by the user from the outside. This operating handle (13) is linked rigidly in translation to the motion transmission element (5) along the rotation axis of the shaft (2, 3) on which it is mounted. The handle (13) can be accessed and operated from the machine (15). Consequently, the movement of the transmission element (5) does not require a long drive line to be moved between the operating positions and/or the neutral position from a driving position. In the embodiment example of FIG. 1, the driving position is the cab of the tractor (T). Unlike a coupling through adhesion in particular, such a handle (13), which is fixed in translation with the motion transmission element (5) along the rotation axis of the shaft (2, 3) on which it is mounted, allows the user to feel by touch when the teeth of the gears concerned mesh together, for example when the teeth of the transmission element (5) mesh together with those of the pinion (10').

The operating handle (13) comprises or is rigidly fastened to a fork (13') engaged with the motion transmission element (5). One end of the fork (13') enters into a groove of the motion transmission element (5) making it possible to transmit at least a translation motion to it, preferably along the rotation axis of the intermediate shaft (4). In the embodiment of FIG. 3, the operating handle (13) comprises a sliding rod on which the fork (13') is fastened. The handle (13), respectively the fork (13'), is mounted so it can slide axially along the axis of the intermediate shaft (4) to move the motion transmission element (5). To this end, the intermediate shaft (4) comprises a slide guiding bore for the handle (13), enabling greater compactness of the gearbox device (1). Preferably however, the intermediate shaft (4) does not mesh with the handle (13). Preferably, it pivots around the handle (13).

Preferably, the handle (13) can be blocked axially along the axis of the intermediate shaft (4). In addition, the intermediate shaft (4) is parallel to the primary shaft (2). In each of the operating positions, the motion transmission element (5) is maintained in an axially fixed position along the rotation axis of the primary shaft (2).

Preferably, the gearbox device (1) comprises a safety casing (8). This casing (8) surrounds at least partially the primary, secondary and intermediate shafts (2, 3, 4). The handle (13) can be blocked thanks to a channel (14) attached to the casing (8). To this end, the channel (14) comprises two support areas for the handle (13) substantially orthogonal to the rotation axis of the intermediate shaft (4).

As can be seen in FIG. 1, the machine (15) can be hitched to the tractor (T) via a coupling frame (16). In particular, the machine (15) can be a tedder with rotors (17) fitted with raking fingers and driven in rotation around vertical axis. The machine (15) comprises a drive line that makes it possible to transmit a rotational drive of a power take-off shaft (18) of the tractor (T) to the rotors (17). This drive line comprises at least one telescopic transmission cardan shaft (19). The shafts (2, 3, 4) of the gearbox device (1) are also part of this drive line.

As shown in FIG. 1, at least the axis of the primary shafts (2) and of the power take-off shaft (18) of the tractor (T) are substantially in the same vertical plane, with the machine (15) in the hitched state, thus limiting the risks of interference between the coupling frame (16) and the transmission shaft (19) during hard turns.

In connection with an advantageous arrangement, the primary shaft (2) and the secondary shaft (3) have coincident rotation axis, enabling even greater compactness. In the preferred embodiment of FIGS. 2 and 3, to advantageously have a limited number of parts, the gearbox device (1) comprises only one intermediate shaft (4). The axis of the intermediate shaft (4) is preferably offset laterally relative to the axis of the primary and secondary shafts (2 and 3).

In accordance with a preferred construction variant, to gain in compactness, the motion transmission element (5) is mounted locked in rotation with the primary shaft (2). To this end, the motion transmission element (5) comprises inner splines to ensure its rotation with the shaft concerned. The primary shaft (2) comprises outer splines matching the inner splines of the motion transmission element (5). Consequently, the primary shaft (2) meshes with the motion transmission element (5) constantly. Further, a slidable pinion (5') is locked in rotation with the motion transmission element (5). Preferably, the slidable pinion (5') is part of the motion transmission element (5). A second intermediate pinion (10') is furthermore locked in rotation with the intermediate shaft (4). Preferably, the second intermediate pinion (10') is part of the intermediate shaft (4).

In the preferred embodiment, the gearbox device (1) comprises a single intermediate shaft (4). Furthermore, a first intermediate pinion (10) is locked in rotation with the intermediate shaft (4). As can be seen in FIG. 3, in the preferred embodiment, the first intermediate pinion (10) is part of the intermediate shaft (4). In other words, the first intermediate pinion (10) and the intermediate shaft (4) form a single part.

In the preferred embodiment, a secondary pinion (3') is mounted locked in rotation with the secondary shaft (3). Preferably, the secondary pinion (3') is part of the secondary shaft (3). The first intermediate pinion (10) meshes with the secondary pinion (3') in at least one of the operating positions. Preferably, the intermediate shaft (4) is permanently coupled in rotation with the secondary shaft (3).

It can be understood from the above that the intermediate shaft (4) is permanently coupled in rotation with that one of the primary shaft (2) and secondary shafts (3) on which the motion transmission element (5) is not mounted (locked in rotation).

As can be seen in FIGS. 2A and 3A, the motion transmission element (5) may have a first operating position, in which the primary shaft (2) and the secondary shaft (3) are kinematically connected via the intermediate shaft (4). In this first operating position of the motion transmission element (5), the second intermediate pinion (10') meshes with the slidable pinion (5'). In this first operating position, the motion transmission element (5) thus sets up a drive line between the primary (2) and secondary (3) shafts, whose gear ratio is defined by the dimensions of the slidable pinion (5'), of the intermediate pinions (10, 10') and of the secondary pinion (3'). Consequently, a first transmission ratio corresponds to the first operating position of the motion transmission element (5).

As can be seen in FIGS. 2C and 3C, the motion transmission element (5) may have a second operating position, in which the primary shaft (2) and the secondary shaft (3) are not kinematically connected via the intermediate shaft (4). In this second operating position of the motion transmission element (5), the second intermediate pinion (10') does not mesh with the slidable pinion (5'). In the preferred embodiment of FIGS. 2C and 3C, in this second operating position, the motion transmission element (5) thus forms a direct drive line between the primary (2) and secondary (3) shafts, respectively by direct drive between the secondary (3) shaft and the motion transmission element (5). In this position therefore, the transmission ratio between the primary shaft (2) and the secondary shaft (3) is 1. Consequently, a second transmission ratio corresponds to the second operating position of the motion transmission element (5). Preferably, the first and second transmission gear ratios are different.

In the preferred embodiment, the primary shaft (2) is the input shaft. Further, in the preferred embodiment, the secondary shaft (3) is the output shaft. In the first operating position of the motion transmission element (5), the first transmission ratio is a reduction ratio. The first transmission ratio of the gearbox device (1) is for example ½ (one-half). Each operating position is obtained by the translation of the motion transmission element (5).

In this way, the two operating positions of the slidable pinion (5') define two distinct kinematic motion transmission and torque paths, with different transmission ratios determined by the gear ratios.

In order to reduce the size of the gearbox device (1), because of the alignment of the rotation axis of the primary shaft (2) and the secondary shaft (3), the shaft (2, 3, 4) to be made to pivot to get the gears to correspond upon a change of transmission ratio is preferably the intermediate shaft (4). The pivoting means (6) is thus configured to make the intermediate shaft (4) pivot. Because the intermediate shaft (4) is permanently coupled in rotation with the secondary shaft (3), operating the pivoting means (6) requires rotating the intermediate shaft (4) and the secondary shaft (3) around their respective rotation axis. In the preferred embodiment, the pivoting means (6) thus makes it possible to make the secondary shaft (3) and the intermediate shaft (4) pivot around their respective rotation axis when the motion transmission element (5) is in the neutral position. In other words, the pivoting means (6) makes it possible to make, by manual operation, the secondary shaft (3) pivot around the rotation axis of the secondary shaft (3) and the intermediate shaft (4) pivot around the rotation axis of the intermediate shaft (4) when the motion transmission element (5) is in the neutral position.

Further, to avoid having to supply too great a force to make the shaft or shafts (2, 3, 4) pivot, the pivoting means (6) may comprise or be associated to a freewheel arranged on the drive line of the machine (15). The gearbox device (1) can thus incorporate a freewheel that allows the shaft or shafts (2, 3, 4) to pivot in the opposite direction to the operating rotation motion of the shaft or shafts (2, 3, 4), thereby facilitating the operation of the pivoting means (6). In particular, the freewheel could be fitted onto any of the shafts (2, 3, 4) of the device (1).

Operating the pivoting means (6) makes it possible to result in the coupling of the gears concerned by the desired operating position, respectively by the sought transmission ratio. In the preferred embodiment, so as to achieve the first operating position, the pivoting means (6) makes it possible to couple the gear of the slidable pinion (5') with that of the second intermediate pinion (10'). According to a possible feature of the invention, the pivoting means (6) comprises an element (7) locked in rotation with one of the primary (2), secondary (3) and intermediate (4) shafts. Preferably, the element (7) is included in one of the primary (2), secondary (3), and intermediate (4) shafts. For example, the element (7) can be machined into one of the primary (2), secondary (3), and intermediate (4) shafts. The element (7) comprises at least one support surface (7") oriented such that it can apply torque on the shaft (2, 3, 4) with which the element (7) is locked in rotation, the torque being applied around the rotation axis of the shaft (2, 3, 4) with which the element (7) is locked in rotation, when a force is applied onto the support surface (7"). Preferably, the element (7) comprises several support surfaces (7"), each oriented parallel to the rotation axis of the shaft (2, 3, 4) with which the element (7) is locked in rotation.

In addition, the pivoting means (6) may comprise a handle (7') that can be operated by the user. To facilitate access to the handle (7'), it can be operated manually from the exterior. To avoid a long drive line, the handle (7') can furthermore be operated from the machine (15). In addition, the handle (7') is preferably not locked in rotation with any of the primary (2), secondary (3), and intermediate (4) shafts. In other words, the handle (7') is not locked in rotation nor with the primary shaft (2), nor with the secondary shaft (3), nor with the intermediate shaft (4). Consequently, the handle (7') is not driven in rotation in any of the operating positions, such that the portion of the handle (7') that is outside the housing (8) cannot cause injury or damage.

More specifically, in the aforementioned context, the element (7) can be housed in the casing (8). Further, the handle (7') can be mounted passing through, and mobile in, the wall of the casing (8). In particular, the handle (7') can be mobile relative to the casing (8) in order to make at least one of the primary (2), secondary (3), and intermediate (4) shafts pivot by resting on a support surface (7"). By incorporating the pivoting means (6) at least partially inside the casing (8), the number of parts and size are reduced. As shown in FIGS. 3 and 4 as an example, the casing (8) may be made of two parts assembled to each other (by screwing) in sealed manner at a connection plane.

The handle (7') could in particular be a key that, by interlocking, makes at least one of the primary (2), secondary (3), and intermediate (4) shafts pivot around its respective rotation axis. In the alternative embodiment of FIG. 6, the key could be an Allen key and the element (7) a hexagonal notch matching this Allen key, for example made in the intermediate shaft (4) or in a part locked in rotation with the intermediate shaft (4). The key can rest on several support surfaces (7") of the element (7), as in the embodiment of FIG. 6. One drawback of a key, however, is that it can be removed from the gearbox device (1) or even lost. To be able to make at least one of the primary (2), secondary (3), and intermediate (4) shafts pivot quickly and/or without having to look for it, the handle (7') can comprise a retaining means connecting it to the casing (8), for example a cable or chain. One drawback of such an embodiment is that it requires a hole in the casing (8) located on the side of the secondary shaft, which is less accessible. Above all, the hole made in the casing (8) requires a plug to prevent leaks of lubricant and/or a guiding means for the shaft concerned with the casing (8). For security purposes, any turning element outside the casing (8) should be avoided. Consequently, the element (7) is preferably included inside the casing (8).

According to a possible embodiment that is both simple and economical, the handle (7') can be translated relative to the casing (8). The handle (7") comprises a ratchet (20) extending at least partially inside the casing (8). Preferably, the ratchet (20) can rest on a surface rigidly fastened to the shaft (2, 3, 4) that is to be made to pivot, to transmit torque to it. In the preferred embodiment, the element (7) of the pivoting means (6) is a wheel (21). Preferably, the ratchet (20) can rest on a support surface (7") of the wheel (21). The wheel (21) has a plurality of support surfaces (7") oriented parallel to the rotation axis of the intermediate shaft (4). Each support surface (7") of the wheel (21) is also oriented substantially radially relative to the rotation axis of the intermediate shaft (4). Preferably, this wheel (21) is a ratchet wheel. Preferably, the wheel (21) is locked in rotation with the intermediate shaft (4), at least along a given direction. According to the embodiment shown in the figures, the wheel (21) is part of the intermediate shaft (4). Preferably, the ratchet (20) rests on the wheel (21) to make the intermediate shaft (4) pivot around its rotation axis and thus achieve the meshing that enables setting up the sought transmission ratio. In the preferred embodiment, the wheel (21) is locked in rotation with the intermediate shaft (4) along the opposite direction to the operating rotation motion of the intermediate shaft (4) only.

According to an embodiment of the handle (7'), it may comprise a push-button (22). Preferably, the push-button is rigidly fastened to the ratchet (20). This push-button (22) extends at least partially outside the casing (8). The handle (7') of the means (6) is mounted with the ability to move in translation relative to the casing (8). Preferably, the handle (7) is mounted with the ability to move in substantially tangential translation relative to the ratchet wheel (21). When the machine (15) is in use, the ratchet (20) is in a retracted position shown in FIG. 5A. The retracted position of the ratchet (20) is also its resting position. Operating the means (6) manually means making the push-button (22) move in translation so that the ratchet (20) rests on the wheel (21) and makes the shaft (2, 3, 4), to which the wheel (21) is rigidly fastened, pivot. In FIG. 5B, the ratchet (20) is in engaged position with the wheel (21). In the preferred embodiment, operating the pivoting means (6) makes it possible for the intermediate shaft (4) to pivot.

The return of the ratchet (20) corresponds to its movement in translation between its engaged position and its retracted position. A return spring (9) can be provided to avoid requiring an additional operation for the return of the ratchet (20). This spring (9) engages the push-button (22) in the retracted position of the ratchet (20). In its retracted position, the push-button (22) is disengaged from the wheel (21) and does not interfere with it. This automatic return of the ratchet (20) to its retracted position ensures that the latter does not disrupt the rotational motion of the shaft concerned in normal use and prevents damaging the ratchet (20).

It can be deduced from FIG. 5B that, by returning the ratchet (20), the latter could interfere with the wheel (21), respectively with the notch adjacent to that on which the ratchet (20) is resting, which could lead to damaging the ratchet (20). According to one embodiment not shown, to return the ratchet (20) to its retracted position without damaging it, the ratchet (20) is articulated with the push-button (22) along an articulation axis oriented perpendicular to the rotation axis of the shaft concerned, i.e. the intermediate shaft (4), in the preferred embodiment. According to the preferred embodiment, the ratchet (20) is rigidly fixed on the push-button (22). Further, the ratchet (20) is configured to be able to bend when returning to the retracted configuration. Preferably, the ratchet (20) is flexible. By providing a flexible ratchet (20) system able to translate tangentially, resting on the matching support surfaces (7") of the teeth of the ratchet wheel (21), it is possible to have a ratchet without the conventional pivoting articulation, which nonetheless retracts without damage when it returns to its retracted position. This is also obtained thanks to the teeth of the ratchet wheel (21) cut accordingly.

In accordance with a practical construction feature, the handle (7') is screwed into the casing (8) in a hole of the latter, making it easier to maintain and disassemble from outside. Preferably, the handle (7') comprises a screw (23) in which the push-button (22) is assembled with a positive adjustment tolerance. In this way, the push-button can translate into the screw (23) relative to the latter and relative to the casing (8). Further, this screw (23) can be configured and arranged to make an oil drain plug and/or be used as an oil level gauge.

For compactness, construction simplicity and cost reasons, the notches of the ratchet wheel (21) can be machined directly into the intermediate shaft (4).

As can be seen in FIGS. 2C and 3C, in the second operating position, the direct drive between the motion transmission element (5) and the secondary shaft (3) is made by a shifting dog (12). To this end, the secondary pinion (3'), respectively the secondary shaft (3), is provided with a gear (12') specific to this direct drive. Preferably the secondary shaft (3), respectively the gear (12') specific to the direct drive, is intended to cooperate with the gear of the slidable pinion (5'). Preferably, this specific gear (12') is made of a plurality of teeth inserted or cut directly into the secondary shaft (3), making it possible to achieve a simple (with few or no additional parts), robust and compact construction. In the embodiment of the figures, to simplify its manufacturing and/or machining, the teeth of the gear (12') are cylindrical, preferably embedded in a piercing. As can be seen in FIG. 5B, the cylindrical teeth of the gear (12') specific to the direct drive are such that they insert themselves in between two teeth of the slidable pinion (5'). The using a shifting dog (12) makes it possible, to change the transmission ratio, to only move the motion transmission element (5) axially. In this way, in the preferred embodiment, the intermediate (10, 10') and secondary (3') pinions do not need to be moved axially to change the transmission ratio. In the preferred embodiment, to reach the second operating position, the pivoting means (6) makes it possible to couple by direct drive, the slidable pinion (5') with the secondary shaft (3), respectively the secondary pinion (3'), by means of the shifting dog (12).

Therefore, to change the transmission ratio, one waits for the machine (15) to stop, one first clears the primary shaft (2) from the secondary shaft (3) by sliding the motion transmission element (5) along its rotation/translation axis from one of the operating positions to a neutral position. In the neutral position, the motion transmission element (5) sets up no drive line between the primary shaft (2) and the secondary shaft (3). Then, while maintaining the axial pressure by means of the handle (13) along one or the other direction, depending on the sought ratio, the primary and secondary shafts are meshed thanks to an adjustment by means of the pivoting means (6) until the new torque transmission path is established. During this sequence of changing the transmission ratio, when the slidable pinion (5') of the motion transmission element (5) is disengaged, by acting on the handle (13), from one of the operating positions and therefore from the shaft with which it meshed, it will be moved to the other operating position and therefore engaged by meshing/dog-clutching with the other shaft by applying pressure on the handle (13) and adjusting the position of this other shaft by means of the pivoting means (6) acting on the intermediate shaft (4) until the mutual meshing of the teeth/shifting dogs of the slidable pinion and of this other shaft is achieved.

It can be seen from the above that changing the transmission ratio consists first in waiting for the primary (2), secondary (3), and intermediate (4) shafts to stop rotating, then to move the motion transmission element (5) axially to the neutral position, then to exert an axial force on the motion transmission element (5) in the same direction as its previous move, while manually operating the pivoting means (6) making it possible to make at least one of the primary (2), secondary (3), and intermediate (4) shafts pivot around its respective rotation axis, until the gears concerned are coupled.

In the embodiment of the figures, changing the transmission ratio of the gearbox device (1) to a first ratio consists first in waiting for the primary (2), secondary (3), and intermediate (4) shafts to stop rotating, then to move the motion transmission element (5) axially in the direction of the secondary shaft (3) to the neutral position, then to exert an axial force on the motion transmission element (5) in the same direction, while manually operating the pivoting means (6) making it possible to make at least one of the primary (2), secondary (3), and intermediate (4) shafts pivot around its respective rotation axis, until the motion transmission element (5) and the intermediate shaft (4) are coupled, respectively until the slidable pinion (5') locked in rotation with the motion transmission element (5) and the second intermediate pinion (10') locked in rotation with the intermediate shaft (4) are coupled.

Further, changing the transmission ratio of the gearbox device (1) to a second ratio consists first in waiting for the primary (2), secondary (3), and intermediate (4) shafts to stop rotating, then to move the motion transmission element (5) axially in the direction opposite to the secondary shaft (3) to the neutral position, then to exert an axial force on the motion transmission element (5) in the same direction—opposite to the secondary shaft (3)—while manually operating the pivoting means (6) making it possible to make at least one of the primary (2), secondary (3), and intermediate (4) shafts pivot around its respective rotation axis, until the motion transmission element (5) and the secondary shaft (3) are coupled, respectively until a direct drive between the motion transmission element (5) and the secondary shaft (3) is achieved.

It can also be seen from FIG. 3 that the axis of the handle (13) advantageously passes through the intermediate shaft (4), with the axis being the same, leading to a compact construction and making it possible to block the locking of the handle (13) by friction with the intermediate shaft (4), which always turns in the same direction.

According to a preferred practical construction of the device (1) shown in the figures, it is provided that:
- the intermediate shaft (4) comprises a first intermediate pinion (10) meshing with a secondary pinion (3') locked in rotation with the secondary shaft (3) and a second intermediate pinion (10');
- a slidable pinion (5') is locked in rotation with the motion transmission element (5); and
- in one or in the first operating position, the slidable pinion (5') meshes with the second intermediate pinion (10') and that, in the or a second operating position, the primary shaft (2) is kinematically connected to the secondary shaft (3) by direct drive.

The invention was described above in relation to a gearbox device (1) with two torque transmission paths and therefore the selection of two possible transmission ratios between the input shaft and the output shaft. However, the invention also relates to a device (not shown) that can provide more than two ratios, for example by providing at least one additional intermediate shaft that makes it possible to set up another transmission path, with another ratio, other than the intermediate shaft (4) shown, between the motion transmission element (5) and the output shaft (3).

The invention also relates to an agricultural machine (15) intended to be connected to a tractor (T) by means of a power take-off shaft (18), which comprises a gearbox device (1) as described above.

Of course, the invention is not limited to the example embodiment described and shown in the attached drawings. Modifications remain possible, in particular concerning the composition of the various elements or the substitution of technical equivalents without departing from the scope of protection of the invention.

The invention claimed is:

1. A gearbox device for agricultural machine comprising:
   a primary shaft;
   a secondary shaft;
   at least one intermediate shaft;
   a motion transmission element moveable between at least two operating positions in which the motion transmission element sets up intermeshing drive lines between the primary shaft and the secondary shaft with different gear ratios, at least one of the drive lines incorporating the intermediate shaft, the motion transmission element passing through at least one neutral position during movement of the motion transmission element between the at least two operating positions; and
   a pivoting means configured to, by a manual operation, make at least one of the primary, secondary, and intermediate shafts pivot around a respective rotation axis thereof when the motion transmission element is in the neutral position.

2. The gearbox device according to claim 1, wherein the motion transmission element is mounted locked in rotation with one of the primary shaft or the secondary shaft, the motion transmission element being mounted with the ability to move in translation along the rotation axis of the shaft on which the motion transmission element is mounted.

3. The gearbox device according to claim 2, wherein the intermediate shaft is permanently coupled in rotation with that one of the primary shaft and secondary shaft on which the motion transmission element is not mounted.

4. The gearbox device according to claim 1, wherein the primary shaft and the secondary shaft have coincident rotation axis.

5. The gearbox device according to claim 1, wherein the motion transmission element has a first operating position, in which the primary shaft and the secondary shaft are kinematically connected via the intermediate shaft, and a second operating position, in which the primary shaft and the secondary shaft are not kinematically connected via the intermediate shaft.

6. The gearbox device according to claim 1, wherein the pivoting means comprises an element locked in rotation with one of the primary, secondary, and intermediate shafts.

7. The gearbox device according to claim 6, wherein the element of the pivoting means is a ratchet wheel locked in rotation with the intermediate shaft, at least along a given direction.

8. The gearbox device according to claim 7, wherein the handle is mounted so as to be movable in substantially tangential translation relative to the ratchet wheel.

9. The gearbox device according to claim 1 wherein the pivoting means comprises a handle that can be operated by a user and can be mounted passing through, and mobile in, a wall of a casing.

10. The gearbox device according to claim 9, wherein the handle comprises a push-button, and the handle is mounted so as to be movable in translation relative to a casing.

11. The gearbox device according to claim 9, wherein the handle comprises a flexible ratchet extending at least partially inside the casing.

12. The gearbox device according to claim 1, wherein the intermediate shaft comprises a first intermediate pinion meshing with a secondary pinion locked in rotation with the secondary shaft and a second intermediate pinion; wherein a slidable pinion is locked in rotation with the motion transmission element; and wherein in one or in the first operating position, the slidable pinion meshes with the second intermediate pinion and in the or a second operating position, the primary shaft is kinematically connected to the secondary shaft by direct drive.

13. An agricultural machine configured to be connected to a tractor by a power take-off shaft, comprising a gearbox device according to claim 1.

* * * * *